United States Patent
Osen et al.

(10) Patent No.: US 7,252,888 B2
(45) Date of Patent: Aug. 7, 2007

(54) AQUEOUS ELASTOMER COATING COMPOSITION AND OBJECTS COATED WITH THE SAME

(75) Inventors: Ernst Osen, Birkenau (DE); Richard Zuber, Gorxheimertal (DE); Jörg Schaupp, Karlsruhe (DE); Volker Urbanski, Rimbach (DE); Stefan Rink, Fischbachtal (DE); Jürgen Henke, Viernheim (DE)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 10/182,315

(22) PCT Filed: Jan. 22, 2001

(86) PCT No.: PCT/EP01/00635

§ 371 (c)(1),
(2), (4) Date: Jan. 23, 2003

(87) PCT Pub. No.: WO01/55266

PCT Pub. Date: Aug. 2, 2001

(65) Prior Publication Data

US 2003/0144400 A1 Jul. 31, 2003

(30) Foreign Application Priority Data

Jan. 27, 2000 (DE) ................. 100 03 578

(51) Int. Cl.
*B32B 27/00* (2006.01)
(52) U.S. Cl. ............. 428/500; 524/413; 524/425; 524/426; 524/427; 524/430; 524/439; 524/440; 524/442; 524/544; 524/545; 524/546; 524/566
(58) Field of Classification Search ........... 524/413, 524/425, 426, 427, 430, 439, 440, 442, 544, 524/545, 546, 566; 428/500
See application file for complete search history.

(56) References Cited

U.S. PATENT DOCUMENTS 6,329,449 B1 * 12/2001 Gorl et al. ............. 523/343

FOREIGN PATENT DOCUMENTS

| DE | 196 22 188 | 12/1997 |
|----|-----------|---------|
| EP | 0 326 394 | 8/1989 |
| EP | 0 778 327 | 6/1997 |
| EP | 0 838 482 | 4/1998 |
| EP | 0 894 837 | 2/1999 |
| GB | 2 253 401 | 9/1992 |

* cited by examiner

*Primary Examiner*—Peter D. Mulcahy
(74) *Attorney, Agent, or Firm*—Kenyon & Kenyon LLP

(57) ABSTRACT

An aqueous elastomer coating composition and objects coated with this elastomer coating composition are described.

The aqueous elastomer coating composition, contains:
a) a polymer latex containing an elastomer such as fluorine rubber, hydrogenated or carboxylated acrylonitrile-butadiene rubber, acrylonitrile-butadiene rubber, and/or acrylate rubber,
b) mineral fillers such as silicates/silicon oxides, silicic acids, pyrogenic silicic acids and/or carbonates, oxides, hydroxides, metal cations with a valence of 2 to 4,
c) crosslinking chemicals such as crosslinking systems based on amine, peroxide, bisphenol or sulfur,
d) optionally dispersants and/or emulsifiers, organic and/or inorganic pigments, foam suppressants, anti-aging agents, heat sensitization agents, thickeners, wetting agents, propellants, foam stabilizers, coagulants, thixotropy agents, acid scavengers such as $MgO$, $Ca(OH)_2$, $ZnO$, $PbO$ or hydrotalcite as well as adhesive agents and
e) water, preferably in demineralized form as the dispersion medium of the elastomer coating compositions.

11 Claims, No Drawings

AQUEOUS ELASTOMER COATING COMPOSITION AND OBJECTS COATED WITH THE SAME

DESCRIPTION

The present invention relates to an aqueous elastomer coating composition. The present invention also relates to objects coated with this elastomer coating composition.

Gaskets, seals and packings are used in almost all industrial applications. A distinction is made between two basic areas of use, i.e., static and dynamic seals. However, static seals are also subject to dynamic processes such as alternating thermal loads or external dynamic forces. Due to the constant increase in requirements made for industrial systems, e.g., in internal combustion engines, the performance potential of seals must also be increased. For example, gaskets today must cover a broader temperature range for use in automotive engineering, e.g., as auxiliary system seals or as cylinder head seals, and must also retain their sealing capability with respect to synthetic oils and coolants, most of which are aggressive.

For implementation of these increased demands of the seal, laminated materials have been developed, i.e., metal sheets are coated with an elastomer. This laminated structure has a very broad spectrum of properties due to the combination of a wide variety of physical properties.

The metal substrate, usually sheet metal having a thickness between 0.1 and 1 mm ensures the mechanical strength and forms the shaping element. The actual sealing element is the elastomer layer, applied to one or both surfaces of the metal substrate.

However, the given profile of properties becomes usable only via the appropriate design of the components and/or the gaskets. Thus the metal substrate and a possible edge bead geometry ensure a prestress in the sealing gap, so the elastomer is pressed into roughness grooves and thus the form-fitting connection which creates the seal is achieved. The metal thus supplies the macroscopic adaptation to the geometry to be sealed and the elastomer supplies the adaptation to the microstructure of the given surfaces. At the same time, this type of gasket permits a considerable reduction in assembly and disassembly effort due to the simple handling because of the inherently rigid structure of the gasket. The structural features of the gasket permit low required screw forces, sealing of narrow flange web widths, good sealing against gases and liquids, and no contamination of the environment around the installation by fibers or fillers.

In principle, two procedures may be differentiated for manufacture of the gaskets. One possibility is to manufacture the gaskets from elastomer-coated sheet metal by cutting and/or punching and embossing methods. To do so, the sheet metal, usually coilware as the starting material, is coated in a precoating method. In contrast with that, in the aftercoating method, the gaskets are first manufactured by cutting and/or punching and embossing techniques and then coated with elastomer. However, both methods have in common the fact that they are coating methods for metal base bodies, coilware or gaskets for production of a laminated composite material.

European Patent Application 894 837 and U.S. Pat. No. 4,503,179 describe coating compositions containing fluorine rubber and objects coated with them. A necessary component of these coating compositions is a (thermoplastic) copolymer of tetrafluoroethylene, hexafluoropropylene and a perfluorovinyl ether. In addition, U.S. Pat. No. 4,339,553 describes an aqueous coating composition containing a fluoroelastomer. All the coating composition described there contain carbon black as at least part of the filler.

The object of the present invention is to provide an aqueous elastomer coating composition and articles coated with this elastomer coating composition which have very good adhesive strength in particular on metallic substrates and have a very good resistance to attack by aqueous coolants in automotive engineering in particular.

This object is achieved according to the present invention by an aqueous elastomer coating composition which contains a) a polymer latex composed of an elastomer such as fluorine rubber, hydrogenated or carboxylated acrylonitrile-butadiene rubber, acrylonitrile-butadiene rubber, and/or acrylate rubber, b) mineral fillers such as silicates/silicon oxides, silicic acids, pyrogenic silicic acids and/or carbonates, oxides, hydroxides, metal cations having a valence of 2 to 4, c) crosslinking chemicals such as amine-, peroxide-, bisphenol- or sulfur-based crosslinking systems d) optionally dispersants and/or emulsifiers, organic and/or inorganic pigments, foam suppressants, anti-aging agents, heat sensitization agents, thickeners, wetting agents, propellants, foam stabilizers, coagulants, thixotropy agents, acid scavengers such as MgO, $Ca(OH)_2$, ZnO, PbO or hydrotalcite as well as adhesive agents, and e) water, preferably in demineralized form as a dispersion medium of the elastomer coating compositions.

Such an elastomer coating composition is free of organic solvents and/or it contains organic solvents only to a very limited extent as a conventional commercial component of the additives indicated. The elastomer-coated metal surfaces produced in this way have a very high physical stability with respect to dynamic and static stresses. The media resistance of the elastomer-coated surfaces is many times greater than that of filler systems based on carbon black and latex and is higher than that of materials based on conventionally produced solvents.

In general, the fluorine rubber is used in the form of an aqueous dispersion. The aqueous dispersion may be produced by an emulsion of the fluorine rubber which is available by emulsion polymerization. As an alternative, an aqueous dispersion prepared by suspension polymerization or bulk polymerization of the starting polymers may also be used. If necessary, the fluorine rubber is pulverized and dispersed in an aqueous medium using a surfactant. The fluorine rubber (FKM) is a highly fluorinated elastic copolymer and/or terpolymer, preferably an elastic copolymer and/or terpolymer containing vinylidene fluoride monomer units and containing at least one monomer of another fluorine-containing ethylenically unsaturated monomer. Examples of other fluorine-containing ethylenically unsaturated monomers include hexafluoropropylene, pentafluoropropylene, trifluoroethylene, trifluorochloroethylene, tetrafluoroethylene, vinyl fluoride, perfluoro(methylvinyl ether), perfluoro(ethylvinyl ether), perfluoro(propylvinyl ether) and others. Of the various fluorine rubbers (FKM), vinylidene fluoride-hexafluoropropylene copolymers and vinylidene fluoride-tetrafluoroethylene-hexafluoropropylene terpolymers are especially preferred.

The fluorine rubber latexes are types that are aminically, bisphenolically or peroxidically crosslinkable. Examples of crosslinking systems include polyamines such as aliphatic polyamines (e.g., triethylenetetramine, tetraethylenepentamine, ethylenediamine, N,N-dicinnamylidene-1,6-hexanediamine, trimethylenediamine, hexamethylenediamine carbamate, ethanolamine, 3,9-bis(3-aminopropyl)-2,4,8,10-tetraoxa-2-spiro[5.5]undecane and others) as well as their salts; aromatic polyamines (such as diaminodiphenylmethane, xylylenediamine, phenylenediamine, diaminodiphenylsulfone and others) as well as their salts; modified polyamines, polyamidamines and polyols such as phenol derivatives (e.g., bisphenol AF, hydroquinone and others); polyhydroxy compounds having hydroxyl groups of the enol type (e.g., phenol resins) or polythiols such as triazinethiol, 1,6-hexanedithiol, 4,4'-dimercaptodiphenyl, 1,5-naphthalenedithiol and others. Crosslinking systems include aids for accelerating crosslinking. Examples of crosslinking aids include quaternary ammonium salts such as DBO-b (diazabicycloundecene benzyl chloride); tertiary amines such as DABCO (diazabicyclooctane); quaternary phosphonium salts such as triphenylphosphine benzyl chloride and others.

Examples of peroxide crosslinking chemicals include:
2,5-dimethyl-2,5-di-tert-butylperoxyhexane
2,5-dimethyl-2,5-di-tert-butylperoxyhexine-3
di-tert-butyl peroxide
dicumyl peroxide
α,α'-di-tert-butylperoxydiisopropyldiisopropylbenzene
dibenzoyl peroxide
1,1-di-tert-butylperoxy-3,3,5-trimethylcyclohexane.

These are used in combination with coagents such as allyl compounds (triallyl isocyanurate, triallyl cyanurate, triallyl phosphate, triallyl citrate), sulfur, methacrylates (1,4-butanediol dimethacrylate, 1,3-butanediol dimethacrylate, ethylene glycol dimethacrylate), N,N'-m-phenylenedimaleimide and/or 1,2-cispolybutadiene.

In addition, it is also possible to use acrylonitrile rubbers having an acrylonitrile content of 20 to 45 wt %, hydrogenated or carboxylated acrylonitrile-butadiene rubbers in combination with peroxidic or sulfur-based crosslinking systems as the polymer latex, and the respective crosslinking system. For polymer latexes based on carboxylated acrylonitrile rubbers, acrylate crosslinking via metal oxides or aminoplast-formaldehyde precondensates, also in combination with sulfur-based crosslinking systems, have also proven to be especially suitable. Acrylate rubbers (ACM) and/or their latexes/dispersions are used in combination with the standard crosslinking systems for ACM rubbers. Anionic surfactants (such as lauryl sulfate salts, perfluoroalkyl carboxylate salts, Ω-hydroperfluoroalkyl carboxylate salts and others), nonionic surfactants (such as polyethylene glycol derivatives, polyethylene glycol-polypropylene glycol derivatives and others), surfactants of the resin type (e.g., alkylpolyethylene glycol ethers, alkylphenyl polyethylene glycol ethers, alkylpolyethylene glycol esters, ethylene glycol propylene glycol copolymers, polyethylene glycol dialkyl esters and others) are used as dispersants and/or emulsifiers.

The aqueous elastomer coating composition advantageously contains per 100 phr (parts per hundred parts of rubber) based on the dry weight of component a), 15 to 400 phr of component b) 1 to 6 phr of component c), 0 to 20 phr each of component d) with the exception of carbon black as the black pigment which amounts to only up to 5 phr and e) 0 to 400 phr water. The amounts of components b), c), d), and water added are selected as a function of the desired viscosity of the elastomer coating composition and the starting concentration of the polymer latex used. The composition of the elastomer coating composition allows processing by spray coating, painting, roller application, dipping, screen printing technique or float or curtain coating. The layers of the elastomer coating composition on the workpiece may amount to 5 to 800 μm depending on the application method and the viscosity established.

The elastomer coating composition advantageously additionally contains a fiber filler such as Aramid fibers, glass fibers, carbon fibers or potassium titanate and/or an embedded fiber nonwoven. Addition of these fibrous fillers leads to an improvement in the relaxation-creep behavior.

An aqueous elastomer coating composition which contains a chemically surface-modified mineral filler at least as part of component b) is especially preferred. Through the use of correspondingly modified fillers, the physical properties and solvent resistance of the coating obtained with it are improved. These are preferably silicates of aluminum, potassium, sodium, magnesium or calcium surface-treated with silanes and/or titanates.

Advantageously a polymer latex based on a fluorine-containing elastomer copolymer or terpolymer is used as component a), a mineral filler modified at the surface by aminosilane such as corresponding wollastonites, silicates of aluminum, potassium, sodium, magnesium or calcium, an aminic vulcanization system, an acid scavenger such as zinc oxide and internal binding promoters based on aminosilane or metal acrylate compounds are used as at least part of component b). An aqueous coating composition on this basis has excellent mechanical stability and solvent resistance of the coatings produced with them.

Examples of the aminosilanes used include:
γ-aminopropyltrimethoxysilane,
γ-aminopropyltriethoxysilane,
γ-(β-aminoethyl)aminopropyltrimethoxysilane,
γ-(β-aminoethyl)aminopropyltriethoxysilane,
γ-(β-aminoethyl)aminopropylmethyldimethoxysilane,
γ-ureidopropyltriethoxysilane or
γ-(β-(β-aminoethyl)aminoethyl)aminopropyltrimethoxysilane.

An alternative to this is an elastomer coating composition containing a polymer latex based on a fluorine-containing elastomer copolymer or terpolymer as component a), at least part of component b) being an epoxysilane surface-modified mineral filler such as corresponding wollastonites, silicates of aluminum, potassium, sodium, magnesium or calcium, a peroxide vulcanization system, an acid scavenger such as zinc oxide, and an internal bonding promoter based on epoxysilane or metal acrylate compounds. Coatings having very good abrasion resistance and solvent resistance have also been obtained using this elastomer coating composition.

An elastomer coating composition for spray coating in particular is especially preferred when it has a viscosity in the range of 4 to 28 s flow time (DIN beaker 4 mm, 20° C.) and a drop time of at least 300 hours. The elastomer coating composition in the stated viscosity range and having the stated pot time are easily integrated into existing installations. In addition, processing time is significantly prolonged.

The viscosity of the elastomer coating composition for a roller application method in particular is advantageously adjusted to a viscosity in the range of 150 to 5000 cps (centipoise second). Consumption of elastomer coating compositions may be reduced by the roller application method because there is no overspray, which would have to be recovered in a complex procedure.

The present invention also includes an object, in particular a two-dimensional object which is coated with an elastomer coating composition according to the present invention. In particular, sealing or vibration and sound absorbing parts are coated with the elastomer coating composition according to the present invention. In the area of automotive engineering, this includes in particular cylinder head seals and gaskets in auxiliary systems such as compressors and/or radiators. The elastomer coating composition is advantageously applied to objects having a surface modified by chemical, mechanical or thermal methods and/or by plasma pretreatment. Chemical modification of the objects to be coated is performed by a basic, acidic, reducing or oxidizing method, depending on the metallic substrate, preferably in the presence of surfactants.

In addition, a chemical modification of surfaces may be performed by phosphatizing, zinc phosphatizing or chromatizing. Thermal activation of surfaces is performed by treatment at elevated temperatures, e.g., above 300° C. Mechanical activation of the surface is performed by brushing, for example. In particular, activation with plasma or other methods which modify the surface by the action of electrons or ions, e.g., the use of low-pressure, medium-pressure or atmospheric plasma or a corona discharge have proven advantageous for the adhesive strength of the elastomer coating composition, resulting in excellent bonding properties between water-based elastomer coating composition and metal.

To improve the adhesive strength, the object may be precoated with an adhesive.

Precoating of the object with an aqueous adhesive is especially preferred because this minimizes the solvent content in the coating method and provides an environmentally acceptable coating method. In particular adhesives based on epoxy phenol, aminosilane or sulfur silane are used as the aqueous adhesive.

The object provided with the aqueous elastomer coating composition according to the present invention will also advantageously be provided with a nonstick coating. This nonstick coating improves the use properties of gaskets produced with it, in particular cylinder head seals, because it simplifies the replacement of defective seals by minimizing coating residues remaining on the cylinder head or engine block. Such nonstick coatings contain substances such as graphite resins, waxes, polytetrafluoroethylene (PTFE) dispersions or molybdenum disulfide ($MoS_2$) preparations.

EXAMPLES

Comparative Example

Fluorine Rubber Latex Compounds Filled with Carbon Black phr (parts per hundred parts of rubber) recipe based on rubber dry solids

| | |
|---|---|
| Fluorine rubber latex | 100 |
| Sodium lauryl sulfate | 2–25 |
| Zinc oxide | 5–30 |
| Thermax MT carbon black | 1–250 |
| Hexamethylenediamine carbamate | 0–400 |
| Water | |

The fluorine rubber latex was placed first in a 2 L container, and then water, the surfactant, the crosslinking system (amine), zinc oxide, and the filler were added and stirred into the latex in the order indicated, using an appropriate propeller stirrer. The elastomer coating composition was filtered through a 100 μm screen to eliminate lumps.

Example 1

Mineral-Filled Fluorine Rubber Latex Compounds phr recipe based on rubber dry solids.

| | |
|---|---|
| Fluorine rubber latex | 100 |
| Naphthalenesulfonic acid-formaldehyde condensation product | 2–25 |
| Zinc oxide | 3–20 |
| Calcium metasilicate | 5–400 |
| N,N'-Dicinnamylidene-1,6-hexanediamine | 1–6 |
| Water | 0–400 |

The fluorine rubber latex, water and the surfactant were placed in a 2 L container. Then the crosslinking system (amine), zinc oxide and both fillers were stirred into the surfactant solution. A suitable high-speed dissolver stirrer was used for this. The elastomer coating composition was passed through a 100 μm mesh to eliminate lumpy components.

Example 2

Mineral-Filled NBR Latex Compound phr recipe based on rubber dry solids.

| | |
|---|---|
| Fluorine rubber latex | 100 |
| Naphthalenesulfonic acid-formaldehyde condensation product | 1–15 |
| Zinc oxide | 2–20 |
| Stearic acid | 0.5–3 |
| Calcium metasilicate | 10–500 |
| Antioxidant | 1–6 |
| Wax | 1–10 |
| Talc | 0–50 |
| Sulfur | 0.3–5 |
| Accelerator | 0.3–9 |
| Water | 0–400 |

Water and the surfactant were placed first in a 2 L container. Then the crosslinking system, zinc oxide, fillers and other additives were stirred into the surfactant solution using a suitable high-speed dissolver stirrer. The dispersion was then placed on a three-roll stand and blended with the latex.

Example 3

Colored Mineral Fluorine Rubber Latex Compounds phr recipe based on rubber dry solids.

| | |
|---|---|
| Fluorine rubber latex | 100 |
| Naphthalenesulfonic acid-formaldehyde condensation product | 0.5–15 |
| Zinc oxide | 3–20 |
| Coated calcium metasilicate | 5–400 |
| Organic pigment | 1–20 |
| Titanium dioxide | 0–50 |
| N,N' dicinnamylidene 1,6-hexanediamine | 1–6 |
| Water | 0–400 |

Water and the surfactant were placed in a 2 L container. Then the crosslinking system, zinc oxide and the filler as well as additional additives were stirred into the surfactant solution using a suitable high-speed dissolver stirrer. The dispersion was then placed on a three-roll stand and blended with the latex.

Example 4

Colored Mineral-Filled Fluorine Rubber Latex Compound phr recipe based on rubber dry solids.

| | |
|---|---|
| Fluorine rubber latex | 100 |
| Naphthalenesulfonic acid-formaldehyde condensation product | 1–15 |
| Zinc oxide | 3–20 |
| Coated calcium metasilicate | 0–300 |
| Inorganic pigment | 1–20 |
| Hexamethylenediaminecarbamate | 1–6 |
| Water | 0–400 |

Water and the surfactant were placed first in a 2 L container. Then the crosslinking system, zinc oxide and the filler and/or pigment as well as additional additives were stirred into the surfactant solution, using a suitable high-speed dissolver stirrer. The dispersion was then placed on a three-roll stand and blended with the latex.

Method of Producing the Elastomer-Metal Composite Parts

The water-based elastomer compounds mentioned in the preceding examples were applied to pretreated sheet metal by various application methods to produce elastomer metal composite parts. The applied layer thicknesses were varied between 5 and 800 μm. The metal parts were pretreated by removing oil residues by thermal treatment or with solvents. The cleaned metal plates were activated and the adhesives (water-based or solvent-based) were applied by spray application or brush application, for example. With the water-based adhesives, especially good wetting properties (low wetting angle) were obtained on metal parts pretreated by surface treatments such as plasma activation or chromatizing. Examples of the influence of surface-modifying/activating methods on the wetting behavior on the example of high grade steel are shown in the following table.

| Contact angle (water) <45° | Contact angle (water) >45° |
|---|---|
| Plasma activated | Solvent removed |
| | Chromatized |
| | Alkaline degreasing |
| | Brushing |
| | Untreated |

The smaller the wetting angle, the better is the wetting with aqueous medium.

After drying the adhesives, where the drying programs must be coordinated with the solvents used, the sheet metal is prepared for coating with the elastomer coating composition.

The water-based elastomer coating compositions are applied according to the application types mentioned above. Application by spray coating or by roller application is suitable for laboratory experiments. The viscosity and the type of application, i.e., the number of applications of a material, for example, determined the layer thickness of the elastomer layer.

A typical viscosity of a latex compound for spray application will be in the range of 6 to 22 second flow time, DIN beaker, 4 mm, 20° C. (DIN EN 2431).

The applied aqueous elastomer coating compositions were dried by a drying program based on the layer thickness, followed by the vulcanization required for the given type of rubber at a suitably high temperature.

Tests

The physical and mechanical quality of the elastomer layer with respect to adhesion of the composite was evaluated by the following methods:

Grid cut test DIN EN 2409; testing adhesion in the unloaded state

Pencil hardness test according to the Toyota factory standard: dynamic shear stress Bending test according to the Toyota factory standard: dynamic strain test The characterization of the elastomer adhesion on the sheet metal substrate is the most characteristic of the tests listed above. To determine the adhesive strength, no absolute physical characteristics are determined but instead comparative testing is performed. In the grid cut test, a grid pattern is cut into the surface of the elastomer using a stencil. It is important here to cut through the elastomer down to the surface of the metal. Then a strip of adhesive tape is secured above the cut grid pattern and pulled away again at a certain angle. When there is low adhesion between the elastomer and metal, individual fragments of elastomer or squares of elastomer of the cut grid will remain adhering to the adhesive tape. A qualitative statement regarding the adhesive strength under direct stress may be obtained by comparison with other materials.

The pencil hardness test is another variant for testing adhesion. The principle of this test is to use pencils flattened under a constant pressure to abrade the elastomer at a defined angle without thereby damaging the surface of the metal. The type and intensity of the damage to the elastomer depend on the hardness of the pencil used. The pencil hardness value is thus used as a reference standard for different elastomer blends and their adhesion to the surface. It is a comparative measure of adhesive strength under shear stress. To describe the adhesive strength under tensile stress comparatively, the elastomer is cut and bent with a bending radius of 180° exactly over the cut line. Depending on the type of separation at the edge of the cut, this is also a qualitative feature of adhesive strength.

In addition, the visual quality was evaluated visually (homogeneity, gloss, surface roughness). The tests required for use in media are stipulated for use as a cylinder head seal (ZKD) or gaskets for auxiliary equipment for engines, for example, have been performed in the form of media storage tests in boiling water (Sandoz test) and by storage in hot liquid coolant media (Toyota A) according to the Toyota factory standard (120° C., 100 hours and 150° C., 50 hours) with a subsequent cross-cut test.

In addition, the electric resistance (breakdown resistance and surface resistance of the water-based elastomer coatings according to DIN IEC 93/VDE 0303 part 30) were tested, and a high specific resistance of the mineral-filled latex compounds in particular could offer advantages due to the reduced tendency to corrosion in the sealing gap of the cylinder head seal of internal combustion engines.

B. Examples of Physical Tests Used to Evaluate the Adhesion of Water-Based Latex Compounds to Metal Surfaces Criteria

| Cross-cut test | Pencil hardness test | Bending test |
|---|---|---|
| <5% = 1 | No abrasion = 1 | No separation = 1 |
| <50% = 2 | Abrasion in rubber = 2 | Separation = 3 |
| >50% = 3 | Complete separation = 3 | |

Degrees of adhesive strength evaluated on the basis of averaged physical tests (cross-cut test, pencil hardness test (2B, HB, 2H), bending test).

| | Aminosilane solvent-based | Aminosilane water-based | Direct bond | Average |
|---|---|---|---|---|
| Latex compound Example 3 | 2.1 | 2.0 | 2.9 | 2.2 |
| Latex compound Comparative example | 1.8 | 2.5 | 2.7 | 2.3 |

What is claimed is:

1. An aqueous elastomer coating composition, comprising
a) a polymer latex comprising at least one of the following elastomers: fluorine rubber, hydrogenated or carboxylated acrylonitrile-butadiene rubber, acrylonitrile-butadiene rubber, and acrylate rubber;
b) a mineral filler comprising at least one of the following mineral fillers: silicates, silicon oxides, silicic acids, pyrogenic silicic acids, carbonates, oxides, hydroxides, and metal cations with a valence of 2 to 4;
wherein at least part of the mineral filler is a chemically surface-modified mineral filler;
c) amine-, peroxide-, bisphenol- or sulfur-based crosslinking chemicals;
d) optionally, at least one of the following: dispersants, emulsifiers, organic pigments, inorganic pigments, foam suppressants, anti-aging agents, heat sensitization agents, thickeners, wetting agents, propellants, foam stabilizers, coagulants, thixotropy agents, MgO, $Ca(OH)_2$, ZnO, PbO, hydrotalcite, and adhesive agents; and
e) water as a dispersion medium of the aqueous elastomer coating composition;
wherein the aqueous elastomer coating composition is free of organic solvents, and
wherein the aqueous elastomer coating composition comprises per 100 phr based on the dry solids of component a),
15 to 400 phr of component b),
1 to 6 phr of component c),
0 to 20 phr of each component d) with the exception of carbon black as a black pigment, which is used in an amount up to 5 phr, and
up to 400 phr of component e).

2. The elastomer coating composition according to claim 1 further comprising at least one of the following fibrous fillers: Aramid fibers, glass fibers, carbon fibers, asbestos fibers, potassium titanate and embedded fiber nonwovens.

3. The elastomer coating composition according to claim 1, wherein
the fluorine rubber comprises a fluorine-containing elastomeric copolymer or terpolymer; and
the chemically surface-modified mineral filler comprises at least one of the following aminosilane or titanate surface-modified mineral fillers: wollastonites, silicates of aluminum, silicates of potassium, silicates of sodium, silicates of magnesium, silicates of calcium, an amine vulcanization system, zinc oxide, and an aqueous adhesive or internal bonding promoter based on aminosilane or metal acrylate compounds.

4. The elastomer coating composition according to claim 1, wherein
the fluorine rubber comprises a fluorine-containing elastomer copolymer or terpolymer; and
the chemically surface-modified mineral filler comprises at least one of the following epoxysilane or titanate surface-modified mineral fillers: wollastonites, silicates of aluminum, silicates of potassium, silicates of sodium, silicates of magnesium, silicates of calcium, a peroxide vulcanization system, zinc oxide and an aqueous-based adhesive or internal bonding promoter based on epoxysilane or metal acrylate compounds.

5. The elastomer coating composition according to claim 1, wherein the composition is a spray coating composition having a viscosity in the range of 4 to 28 seconds of flow time, DIN beaker 4 mm, 200° C., and a pot time of at least 300 hours.

6. The elastomer coating composition according to claim 1, wherein the composition is applied by roller application and has a viscosity in the range of 50 to 6000 cps.

7. A object, which is flat, and coated with the elastomer coating composition according to claim 1.

8. The object according to claim 7, wherein the object has a surface modified by a chemical, mechanical or thermal method, or by plasma pretreatment.

9. The object according to claim 7, wherein the object is precoated with an adhesive.

10. The object according to claim 9, wherein the object is precoated with an aqueous adhesive.

11. The object according to claim 9, wherein the object comprises a nonstick coating.

* * * * *